United States Patent
Zhi et al.

(10) Patent No.: US 12,230,758 B2
(45) Date of Patent: Feb. 18, 2025

(54) ELECTROLYTE FUNCTIONAL ADDITIVE FOR LITHIUM ION BATTERY, LITHIUM ION BATTERY ELECTROLYTE AND LITHIUM ION BATTERY

(71) Applicant: SVOLT ENERGY TECHNOLOGY CO., LTD., Jiangsu (CN)

(72) Inventors: Yanhui Zhi, Jiangsu (CN); Ying Liu, Jiangsu (CN)

(73) Assignee: SVOLT ENERGY TECHNOLOGY CO., LTD., Jiangsu (CN)

( * ) Notice: Subject to any disclaimer, the term of this patent is extended or adjusted under 35 U.S.C. 154(b) by 218 days.

(21) Appl. No.: 17/788,286

(22) PCT Filed: Nov. 6, 2020

(86) PCT No.: PCT/CN2020/127182
§ 371 (c)(1),
(2) Date: Jun. 22, 2022

(87) PCT Pub. No.: WO2021/243953
PCT Pub. Date: Dec. 9, 2021

(65) Prior Publication Data
US 2023/0113720 A1    Apr. 13, 2023

(30) Foreign Application Priority Data
Jun. 1, 2020  (CN) .......................... 202010485949.0

(51) Int. Cl.
*H01M 10/0567* (2010.01)
*H01M 4/505* (2010.01)
*H01M 4/525* (2010.01)
*H01M 10/0525* (2010.01)
*H01M 10/0568* (2010.01)
*H01M 10/0569* (2010.01)
*H01M 4/02* (2006.01)

(52) U.S. Cl.
CPC ....... *H01M 10/0567* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 2004/028* (2013.01); *H01M 2300/004* (2013.01); *H01M 2300/0042* (2013.01)

(58) Field of Classification Search
None
See application file for complete search history.

(56) References Cited

U.S. PATENT DOCUMENTS

2018/0006329 A1* 1/2018 Xiao ................ H01M 10/0567

FOREIGN PATENT DOCUMENTS

| CN | 102082297 A | 6/2011 |
|---|---|---|
| CN | 101916878 B | 12/2012 |
| CN | 103000945 A | 3/2013 |
| CN | 103633308 A | 3/2014 |
| CN | 103825016 A | 5/2014 |
| CN | 104269576 A | 1/2015 |
| CN | 105070908 A | 11/2015 |
| CN | 105576283 A | 5/2016 |
| CN | 105845975 A | 8/2016 |
| CN | 105958062 A | 9/2016 |
| CN | 105958119 A | 9/2016 |
| CN | 106025354 A | 10/2016 |
| CN | 106450454 A | 2/2017 |
| CN | 106848393 A | 6/2017 |
| CN | 107768719 A | 3/2018 |
| CN | 108075115 A | 5/2018 |
| CN | 108539267 A | 9/2018 |
| CN | 109686931 A | 4/2019 |
| CN | 109935905 A | 6/2019 |
| CN | 110061225 A | 7/2019 |
| CN | 110190253 A | 8/2019 |
| CN | 110233289 A | 9/2019 |
| CN | 110336020 A | 10/2019 |
| CN | 110676452 A | 1/2020 |
| CN | 111129589 A | 5/2020 |
| CN | 111509298 A | 8/2020 |
| CN | 112713308 A | 4/2021 |
| DE | 102014108254 A1 | 12/2015 |
| IN | 111211351 A | 5/2020 |
| JP | 08138670 A | 5/1996 |
| JP | 08171935 A | 7/1996 |
| JP | 0955210 A | 2/1997 |
| JP | 2007128723 A | 5/2007 |
| JP | 2009137834 A | 6/2009 |
| JP | 2010114088 A | 5/2010 |
| JP | 2018125219 A | 8/2018 |
| JP | 2019091692 A | 6/2019 |
| WO | 2011124038 A1 | 10/2011 |
| WO | 2020057398 A1 | 3/2020 |

OTHER PUBLICATIONS

Indian first Office Action for corresponding application IN202217038007; Report dated Feb. 1, 2023.
EPO's EESR issued on Oct. 1, 2024 for EP20939302.4.

* cited by examiner

*Primary Examiner* — Carlos Barcena
(74) *Attorney, Agent, or Firm* — Samson G. Yu

(57) ABSTRACT

Provided are an electrolyte functional additive for a lithium ion battery, a lithium ion battery electrolyte and the lithium ion battery. Calculated in parts by weight, the functional additive includes 0.1-0.5 parts of lithium tetrafluoroborate, 0.3-1.5 parts of lithium bisoxalate borate, and 0.2-2 parts of vinylene carbonate. The functional additive guarantees that a dense and stable SEI film is formed on the surface of a negative electrode, and high-temperature storage performance and high-temperature cycle performance of the battery are improved.

17 Claims, No Drawings

ELECTROLYTE FUNCTIONAL ADDITIVE FOR LITHIUM ION BATTERY, LITHIUM ION BATTERY ELECTROLYTE AND LITHIUM ION BATTERY

The present application is a National Stage of International Patent Application No: PCT/CN2020/127182 filed on Nov. 6, 2020, which application claims the benefit of priority to the Chinese patent application No. 202010485949.0 filed on Jun. 1, 2020, which is herein incorporated by reference in their entirety.

TECHNICAL FIELD

The disclosure relates to the technical field of power battery materials, and in particular to an electrolyte functional additive for a lithium ion battery, a lithium ion battery electrolyte and the lithium ion battery.

BACKGROUND ART

Cost and safety of power batteries are pain points that need to be solved urgently in electrification of automobiles at present in the industry, and the safety is a bottom line of the development of the electric automobiles as well as a top priority of concerns of consumers. Whether the electric automobiles can truly be compared with fuel automobiles in the market is directly affected by whether the cost can be reduced. A high pressure of the safety and cost makes the power batteries and industry chain enterprises continue to explore a new direction on the basis of existing material systems. As a strategic resource, fluctuations in prices of cobalt may directly affect the cost of a final battery cell. Therefore, mainstream international power battery enterprises take low-cobalt and cobalt-free batteries as a research and development direction of next-generation power batteries.

Along with the decrease of the cobalt content of a positive electrode material, ionic and electronic conductivity of the material is deteriorated, and an overall direct current internal resistance of the battery is increased; at the same time, a cobalt element is removed so that the stability of a layered structure of the positive electrode material is worsen, and metal ions, especially a manganese ion, are increasingly precipitated, and deposited to a negative electrode, so that a negative SEI film is destroyed, and a cycle life of the battery is affected. At the same time, the metal ions on the surface of the material may also easily catalyze an electrolyte, so that it is oxidized and decomposed on the surface of a positive electrode, the electrolyte is consumed, and the cycle life of the battery is affected. At present, there is no electrolyte specifically for cobalt-free layered materials in the market to meet various performance requirements of the cobalt-free battery.

SUMMARY

A main purpose of the disclosure is to provide an electrolyte functional additive for a lithium ion battery, a lithium ion battery electrolyte and the lithium ion battery, as to solve a problem in the prior art that a cycle life of the battery is reduced while the electrolyte is applied to the low-cobalt or cobalt-free lithium ion battery.

In order to achieve the above purpose, according to one aspect of the disclosure, an electrolyte functional additive for a lithium ion battery is provided, and calculated in parts by weight, the functional additive includes 0.1-0.5 parts of lithium tetrafluoroborate, 0.3-1.5 parts of lithium bisoxalate borate, and 0.2-2 parts of vinylene carbonate.

Further, a weight ratio of the above lithium tetrafluoroborate and lithium bisoxalate borate satisfies a range of 1:2-1:4.

Further, calculated in parts by weight, the above functional additive further includes 0.2-1 part of pyridine trifluoroborate.

According to another aspect of the disclosure, a lithium ion battery electrolyte is provided, including an organic solvent, an electrolyte lithium salt, and a functional additive, the functional additive is any one of the above functional additives.

Further, the mass content of the functional additive in the above lithium ion battery electrolyte is 2.5-5%.

Further, calculated by lithium ions, the concentration of the electrolyte lithium salt in the above lithium ion battery electrolyte is 0.8-2.0 mol/L, preferably the electrolyte lithium salt includes lithium hexafluorophosphate and lithium bisfluorosulfonimide, and further preferably a molar ratio of the lithium hexafluorophosphate and the lithium bisfluorosulfonimide is 6-10:1.

Further, the above organic solvent includes at least one of ethylene carbonate, propylene carbonate, diethyl carbonate, and ethyl methyl carbonate, preferably the organic solvent is selected from a mixture formed by arbitrary three or more of the ethylene carbonate, the propylene carbonate, the diethyl carbonate, and the ethyl methyl carbonate, and further preferably a mass ratio of the ethylene carbonate, the propylene carbonate, the diethyl carbonate and the ethyl methyl carbonate in the organic solvent is 2-3:0.3-0.8:1.5-3:4-7.

According to another aspect of the disclosure, a lithium ion battery is provided, the lithium ion battery includes a positive electrode plate, a diaphragm, a negative electrode plate and an electrolyte, and the electrolyte is any one of the above electrolytes.

Further, the above positive electrode plate includes a positive electrode active substance, and the positive electrode active substance includes a nickel-manganese binary layered material $LiNi_xMn_yO_2$, herein $0.5<x\leq0.8$, $0.1<y\leq0.5$ and $x+y=1$.

Further, the above diaphragm is a ceramic diaphragm.

By applying the technical scheme of the disclosure, the electrolyte functional additive for the lithium ion battery of the disclosure includes the vinylene carbonate, the lithium tetrafluoroborate, and the lithium bisoxalate borate. It is guaranteed by cooperated use of multiple additives that a dense and stable SEI film is formed on the surface of the negative electrode, and high-temperature storage performance and high-temperature cycle performance of the battery are improved. Herein, the lithium tetrafluoroborate may react with the lithium bisoxalate borate in a certain degree, a formed intermediate product, lithium difluoroborate, may form a film on the surface of the positive electrode by oxidation on the one hand, the electrolyte is effectively prevented from directly contacting with the positive electrode material, and the electrolyte is avoided from being catalyzed and oxidized on the surface of the positive electrode; on the other hand, an O hole center on the M-O surface of the positive electrode material reacts with ODFB⁻ to generate a Lewis acid $F_2BOC \cdot O$ free radical and then coordinate with 0 on the M-O surface, and at the same time, they are mutually combined to form a bond through two free electrons, and stably exist on the M-O surface, thereby the activity of the active site is inhibited, the oxidative decomposition of the electrolyte is reduced, and the cycle performance of the battery is improved; and the dissolution of metal ions may also be reduced, the negative electrode SEI film is avoided from being destroyed by the metal ions, and the cycle performance of the battery is improved. The lithium ion battery electrolyte having the functional additive of the present application contains the lithium tetrafluoroborate, the lithium bisoxalate borate and the lithium difluoroborate at the same time while used, and may still maintain a higher electrical property in a low-temperature or high-temperature environment by using respective advantages.

DETAILED DESCRIPTION OF THE EMBODIMENTS

It should be noted that embodiments of the present application and features in the embodiments may be combined with each other in the case without conflicting. The disclosure is described in detail below in combination with the embodiments.

In a typical implementation mode of the present application, an electrolyte functional additive for a lithium ion battery is provided, and calculated in parts by weight, the functional additive includes 0.1-0.5 parts of lithium tetrafluoroborate, 0.3-1.5 parts of lithium bisoxalate borate, and 0.2-2 parts of vinylene carbonate.

The electrolyte functional additive for the lithium ion battery of the disclosure includes the vinylene carbonate, the lithium tetrafluoroborate, and the lithium bisoxalate borate. It is guaranteed by cooperated use of multiple additives that a dense and stable SEI film is formed on the surface of the negative electrode, and high-temperature storage performance and high-temperature cycle performance of the battery are improved. Herein, the lithium tetrafluoroborate may react with the lithium bisoxalate borate in a certain degree, a formed intermediate product, lithium difluoroborate, may form a film on the surface of the positive electrode by oxidation on the one hand, the electrolyte is effectively prevented from directly contacting with the positive electrode material, and the electrolyte is avoided from being catalyzed and oxidized on the surface of the positive electrode; on the other hand, an O hole center on the M-O surface of the positive electrode material reacts with $ODFB^-$ to generate a Lewis acid $F_2BOC \cdot O$ free radical and then coordinate with O on the M-O surface, and at the same time, they are mutually combined to form a bond through two free electrons, and stably exist on the M-O surface, thereby the activity of the active site is inhibited, the oxidative decomposition of the electrolyte is reduced, and the cycle performance of the battery is improved; and the dissolution of metal ions may also be reduced, the negative electrode SEI film is avoided from being destroyed by the metal ions, and the cycle performance of the battery is improved. The lithium ion battery electrolyte having the functional additive of the present application contains the lithium tetrafluoroborate, the lithium bisoxalate borate and the lithium difluoroborate at the same time while used, and may still maintain a higher electrical property in a low-temperature or high-temperature environment by using respective advantages.

In order to further enable the lithium tetrafluoroborate, the lithium bisoxalate borate and the lithium difluoroborate to achieve a better synergistic effect, preferably a weight ratio of the above lithium tetrafluoroborate and lithium bisoxalate borate satisfies a range of 1:2-1:4.

In an embodiment of the present application, calculated in parts by weight, the above functional additive further includes 0.2-1 part of pyridine trifluoroborate. A trifluoroboric acid group in the pyridine trifluoroborate, on the one hand, may complex an acidic substance in the electrolyte, and reduce damage thereof to the negative electrode SEI film and the dissolution of the positive electrode metal ions, on the other hand, it may dissolve lithium fluoride in a positive and negative electrode interface film, and reduce a positive and negative electrode interface impedance, thereby a direct current internal resistance of the battery is reduced; and at the same time, a pyridine group may complex manganese ions dissolved from the positive electrode, damage thereof to the negative electrode is reduced, and the cycle performance of the battery is further improved.

In another implementation mode of the present application, a lithium ion battery electrolyte is provided, including an organic solvent, an electrolyte lithium salt, and a functional additive, the functional additive is the above functional additive.

While the functional additive of the present application is applied to the lithium ion battery electrolyte, an alternating current impedance of the electrolyte is significantly reduced, and it is beneficial to improve rate performance and low-temperature performance. While applied to the lithium ion battery, the SEI film formed on the surface of the negative electrode is dense and stable, and at the same time, a protective film is formed on the surface of the positive electrode, the high-temperature performance and cycle performance of the battery may be significantly improved.

In a preferred embodiment of the present application, the mass content of the functional additive in the above lithium ion battery electrolyte is 2.5-5%. So a function of the functional additive may be brought into full play.

The electrolyte lithium salt used in the lithium ion battery electrolyte of the present application may adopt an electrolyte lithium salt commonly used in the prior art. In order to guarantee the overall excellent performance of the lithium ion battery, preferably calculated by lithium ions, the concentration of the electrolyte lithium salt in the above lithium ion battery electrolyte is 0.5-2.0 mol/L. Through experiments, preferably the above electrolyte lithium salt includes lithium hexafluorophosphate and lithium bisfluorosulfonimide, and further preferably a molar ratio of the lithium hexafluorophosphate and the lithium bisfluorosulfonimide is 6-10:1. The conductivity of the electrolyte may be significantly improved by adding the lithium bisfluorosulfonimide, the rate performance and low-temperature performance of the battery are improved, and at the same time, the high-temperature stability thereof may also significantly improve the high-temperature performance of the electrolyte; and the lithium bisfluorosulfonimide may also be deposited on the surface of the positive electrode, and it has a certain protective effect on the positive electrode.

The organic solvent in the lithium ion battery electrolyte is used to fully dissolve and disperse the electrolyte lithium salt and the functional additive therein, so that respective functions may be brought into full play, and the organic solvent used in the present application may adopt a solvent commonly used in the field. For example, the organic solvent includes at least one of ethylene carbonate, propylene carbonate, diethyl carbonate, and ethyl methyl carbonate, preferably the organic solvent is selected from a mixture formed by arbitrary three or more of the ethylene carbonate, the propylene carbonate, the diethyl carbonate, and the ethyl methyl carbonate, and further preferably a mass ratio of the ethylene carbonate, the propylene carbonate, the diethyl carbonate and the ethyl methyl carbonate in the organic solvent is 2-3:0.3-0.8:1.5-3:4-7. The combination of the above organic solvents may better take into account the high and low temperature performance of the battery on the basis of guaranteeing that the electrolyte satisfies a certain electrical conductivity.

In another implementation mode of the present application, a lithium ion battery is provided, the lithium ion battery includes a positive electrode plate, a diaphragm, a negative electrode plate and an electrolyte, and the electrolyte is any one of the above electrolytes.

In the lithium ion battery having the lithium ion battery electrolyte of the present application, the alternating current impedance of the electrolyte therein is significantly reduced, and it is beneficial to improve the rate performance and low-temperature performance. The SEI film formed on the surface of the negative electrode is dense and stable, and at the same time, a protective film is formed on the surface of the positive electrode, so the high-temperature performance and cycle performance of the battery may be significantly improved.

The lithium ion battery electrolyte of the present application is suitable for an existing conventional lithium ion battery. While it is applied to a cobalt-free lithium ion battery or a low-cobalt lithium ion battery, it may still make the battery maintain the high cycle performance.

In an embodiment, the above positive electrode plate includes a positive electrode active substance, and the positive electrode active substance includes a nickel-manganese binary layered material $LiNi_xMn_yO_2$, herein $0.5<x≤0.8$, $0.1<y≤0.5$ and $x+y=1$. The above nickel-manganese binary layered material does not contain a cobalt element, a cost of a raw material is further reduced, and it has a certain strategic significance. Cooperatively used with the electrolyte, it may well make up for disadvantages of the material itself, and maximally meet various performance requirements of the battery.

In an embodiment, the above diaphragm is a ceramic diaphragm. The ceramic diaphragm includes a polyolefin diaphragm matrix and a ceramic coating coated on the polyolefin diaphragm. The ceramic coating may be an aluminum oxide coating. The polyolefin diaphragm matrix is a PE material, and a thickness of the ceramic coating is 2-3 μm.

The beneficial effects of the present application are further described below in combination with the embodiments and contrast examples.

Embodiment 1

An electrolyte functional additive for a lithium ion battery in this embodiment is formed by the following components in parts by weight: 0.3 parts of lithium tetrafluoroborate, 1.0 part of lithium bisoxalate borate, 0.5 parts of pyridine trifluoroborate, and 1 part of vinylene carbonate.

The lithium ion battery electrolyte of this embodiment is formed by an organic solvent, an electrolyte lithium salt and a functional additive; the organic solvent is formed by ethylene carbonate, propylene carbonate, diethyl carbonate and ethyl methyl carbonate, and a mass ratio of the ethylene carbonate, the propylene carbonate, the diethyl carbonate and the ethyl methyl carbonate is 2.5:0.5:2:5; the electrolyte lithium salt is formed by lithium hexafluorophosphate and lithium bis(fluorosulfonyl)imide, and a molar ratio of the lithium hexafluorophosphate and the lithium bisfluorosulfonimide is 6:1, the total molar concentration of the electrolyte lithium salt in the electrolyte is 1.2 mol/L; and the amount of the functional additive in the electrolyte is 4%.

Embodiment 2

A difference from Embodiment 1 is that an electrolyte functional additive for a lithium ion battery in this embodiment is formed by the following components in parts by weight: 0.25 parts of lithium tetrafluoroborate, 1.0 part of lithium bisoxalate borate, 0.5 parts of pyridine trifluoroborate, and 1 part of vinylene carbonate.

Embodiment 3

A difference from Embodiment 1 is that an electrolyte functional additive for a lithium ion battery in this embodiment is formed by the following components in parts by weight: 0.5 parts of lithium tetrafluoroborate, 1.0 part of lithium bisoxalate borate, 0.5 parts of pyridine trifluoroborate, and 1 part of vinylene carbonate.

Embodiment 4

A difference from Embodiment 1 is that an electrolyte functional additive for a lithium ion battery in this embodiment is formed by the following components in parts by weight: 0.1 parts of lithium tetrafluoroborate, 1.0 part of lithium bisoxalate borate, 0.5 parts of pyridine trifluoroborate, and 1 part of vinylene carbonate.

Embodiment 5

A difference from Embodiment 1 is that an electrolyte functional additive for a lithium ion battery in this embodiment is formed by the following components in parts by weight: 0.3 parts of lithium tetrafluoroborate, 1.5 parts of lithium bisoxalate borate, 0.5 parts of pyridine trifluoroborate, and 1 part of vinylene carbonate.

Embodiment 6

A difference from Embodiment 1 is that an electrolyte functional additive for a lithium ion battery in this embodiment is formed by the following components in parts by weight: 0.3 parts of lithium tetrafluoroborate, 0.3 parts of lithium bisoxalate borate, 0.5 parts of pyridine trifluoroborate, and 1 part of vinylene carbonate.

Embodiment 7

A difference from Embodiment 1 is that an electrolyte functional additive for a lithium ion battery in this embodiment is formed by the following components in parts by weight: 0.3 parts of lithium tetrafluoroborate, 1.0 part of lithium bisoxalate borate, 0.5 parts of pyridine trifluoroborate, and 0.2 parts of vinylene carbonate.

Embodiment 8

A difference from Embodiment 1 is that an electrolyte functional additive for a lithium ion battery in this embodiment is formed by the following components in parts by weight: 0.3 parts of lithium tetrafluoroborate, 1.0 part of lithium bisoxalate borate, 0.5 parts of pyridine trifluoroborate, and 2 parts of vinylene carbonate.

Embodiment 9

A difference from Embodiment 1 is that an electrolyte functional additive for a lithium ion battery in this embodiment is formed by the following components in parts by weight: 0.3 parts of lithium tetrafluoroborate, 1.0 part of lithium bisoxalate borate, 0.2 parts of pyridine trifluoroborate, and 1 part of vinylene carbonate.

Embodiment 10

A difference from Embodiment 1 is that an electrolyte functional additive for a lithium ion battery in this embodiment is formed by the following components in parts by weight: 0.3 parts of lithium tetrafluoroborate, 1.0 part of lithium bisoxalate borate, 1 part of pyridine trifluoroborate, and 1 part of vinylene carbonate.

Embodiment 11

A difference from Embodiment 1 is that an electrolyte functional additive for a lithium ion battery in this embodiment is formed by the following components in parts by weight: 0.3 parts of lithium tetrafluoroborate, 1.0 part of lithium bisoxalate borate, and 1 part of vinylene carbonate.

Embodiment 12

A difference from Embodiment 1 is that the total molar concentration of the electrolyte lithium salt in the electrolyte is 0.8 mol/L.

Embodiment 13

A difference from Embodiment 1 is that the total molar concentration of the electrolyte lithium salt in the electrolyte is 2.0 mol/L.

Embodiment 14

A difference from Embodiment 1 is that the total molar concentration of the electrolyte lithium salt in the electrolyte is 2.5 mol/L.

Embodiment 15

A difference from Embodiment 1 is that the electrolyte lithium salt is formed by lithium hexafluorophosphate and lithium bisfluorosulfonimide, and a molar ratio of the lithium hexafluorophosphate and the lithium bisfluorosulfonimide is 10:1.

Embodiment 16

A difference from Embodiment 1 is that the electrolyte lithium salt is formed by lithium hexafluorophosphate and lithium bisfluorosulfonimide, and a molar ratio of the lithium hexafluorophosphate and the lithium bisfluorosulfonimide is 4:1.

Embodiment 17

A difference from Embodiment 1 is that a mass ratio of ethylene carbonate, propylene carbonate, diethyl carbonate and ethyl methyl carbonate is 2:0.8:1.5:7.

Embodiment 18

A difference from Embodiment 1 is that a mass ratio of ethylene carbonate, propylene carbonate, diethyl carbonate and ethyl methyl carbonate is 3:0.3:3:4.

Embodiment 19

A difference from Embodiment 1 is that the organic solvent is formed by ethylene carbonate, propylene carbonate and ethyl methyl carbonate, and a mass ratio of the ethylene carbonate, the propylene carbonate and the ethyl methyl carbonate is 2.5:0.5:7.

Embodiment 20

A difference from Embodiment 1 is that the organic solvent is formed by ethylene carbonate, diethyl carbonate and ethyl methyl carbonate, and a mass ratio of the ethylene carbonate, the diethyl carbonate and the ethyl methyl carbonate is 3:2:5.

Embodiment 21

A difference from Embodiment 1 is that the mass content of the functional additive in the electrolyte is 2%.

Embodiment 22

A difference from Embodiment 1 is that the mass content of the functional additive in the electrolyte is 5%.

Embodiment 23

A difference from Embodiment 1 is that the mass content of the functional additive in the electrolyte is 1.5%.

Contrast Example 1

A lithium ion battery electrolyte in the contrast example is formed by an organic solvent, an electrolyte lithium salt and a functional additive; the organic solvent is formed by ethylene carbonate, propylene carbonate, diethyl carbonate and ethyl methyl carbonate, and a mass ratio of the ethylene carbonate, the propylene carbonate, the diethyl carbonate and the ethyl methyl carbonate is 2.5:0.5:2:5; the electrolyte lithium salt is lithium hexafluorophosphate, and the total molar concentration of the electrolyte lithium salt in the electrolyte is 1.1 mol/L; the functional additive is formed by the following components in parts by weight: 1 part of vinylene carbonate and 1 part of lithium difluorophosphate; and a mass percentage of the vinylene carbonate in the lithium ion battery electrolyte is 1%.

Contrast Example 2

A different from Embodiment 1 is that an electrolyte functional additive for a lithium ion battery in this embodiment is formed by the following components in parts by weight: 1 part of lithium difluoroborate, 0.5 parts of pyridine trifluoroborate, and 1 part of vinylene carbonate.

Contrast Example 3

A different from Embodiment 1 is that an electrolyte functional additive for a lithium ion battery in this embodiment is formed by the following components in parts by weight: 0.3 parts of lithium tetrafluoroborate, 2.0 parts of lithium bisoxalate borate, and 1 part of vinylene carbonate.

Contrast Example 4

A different from Embodiment 1 is that an electrolyte functional additive for a lithium ion battery in this embodiment is formed by the following components in parts by weight: 0.3 parts of lithium tetrafluoroborate, 1.0 part of lithium bisoxalate borate, and 2.5 part of vinylene carbonate.

Test

Lithium ion batteries are respectively prepared with the lithium ion battery electrolytes of the embodiments and the contrast examples, and the cycle performances of the obtained lithium ion batteries are tested. While the lithium ion batteries are prepared, artificial graphite is used as a negative electrode active substance to make a negative electrode plate, and $LiNi_{0.75}Mn_{0.25}O_2$ is used as a positive electrode active substance to make a positive electrode plate. A ceramic diaphragm is used, and the lithium ion battery electrolytes of the embodiments and contrast examples are used respectively. An assembly method for a conventional lithium ion battery is used to make a 5 Ah lithium ion battery; the ceramic diaphragm used includes a PE diaphragm matrix and an aluminum oxide coating coated on the diaphragm matrix, and a thickness of the aluminum oxide coating is 2-3 μM.

The cycle performances of the lithium ion batteries prepared above are tested, and each battery is cycled for 500 times, and a battery capacity retention rate before and after the cycle is calculated. Test conditions are as follows:

Normal-temperature performance test: 1.0 C of rate discharge, 1.0 C of rate charge, 2.8-4.3 V of a voltage range, and 25±5° C. of a temperature;

High-temperature performance test: 1.0 C of rate discharge, 1.0 C of rate charge, 2.8-4.3 V of a voltage range, and 45±5° C. of a temperature; and Low-temperature performance test: fully charge at 25±5° C., discharge at 1.0 C under −20° C., and 2.8-4.3 V of a voltage range. Test results are shown in Table 1.

TABLE 1

|  | Number of cycles | Normal-temperature cycle capacity retention rate | High-temperature cycle capacity retention rate | Low-temperature discharge capacity retention rate |
|---|---|---|---|---|
| Embodiment 1 | 500 | 99.4% | 95.0% | 55.0% |
| Embodiment 2 | 500 | 99.3% | 95.4% | 51.0% |
| Embodiment 3 | 500 | 98.9% | 94.3% | 58.0% |
| Embodiment 4 | 500 | 98.1% | 93.7% | 48.0% |
| Embodiment 5 | 500 | 98.3% | 94.1% | 47.0% |
| Embodiment 6 | 500 | 98.1% | 93.5% | 48.0% |
| Embodiment 7 | 500 | 98.3% | 93.4% | 57.0% |
| Embodiment 8 | 500 | 99.1% | 94.5% | 51.0% |
| Embodiment 9 | 500 | 98.2% | 93.5% | 52.0% |
| Embodiment 10 | 500 | 99.0% | 95.2% | 50.0% |
| Embodiment 11 | 500 | 97.5% | 92.8% | 53.0% |
| Embodiment 12 | 500 | 98.9% | 94.8% | 47.0% |
| Embodiment 13 | 500 | 99.2% | 95.4% | 57.0% |
| Embodiment 14 | 500 | 98.5% | 94.1% | 45.0% |
| Embodiment 15 | 500 | 99.2% | 95.3% | 53.0% |
| Embodiment 16 | 500 | 99.4% | 95.3% | 58.0% |
| Embodiment 17 | 500 | 99.5% | 94.9% | 58.0% |
| Embodiment 18 | 500 | 99.4% | 95.0% | 50.0% |
| Embodiment 19 | 500 | 99.4% | 94.0% | 56.0% |
| Embodiment 20 | 500 | 98.0% | 95.1% | 48.0% |
| Embodiment 21 | 500 | 97.9% | 93.8% | 60.0% |
| Embodiment 22 | 500 | 99.4% | 95.0% | 46.0% |
| Embodiment 23 | 500 | 95.0% | 91.3% | 56.0% |
| Contrast example 1 | 500 | 95.3% | 90% | 54% |
| Contrast example 2 | 500 | 96.1% | 91% | 52% |
| Contrast example 3 | 500 | 96% | 92.5% | 43% |
| Contrast example 4 | 500 | 96.3% | 93% | 45% |

It may be seen from the above descriptions that the above embodiments of the disclosure achieve the following technical effects.

The electrolyte functional additive for the lithium ion battery of the disclosure includes the vinylene carbonate, the lithium tetrafluoroborate, and the lithium bisoxalate borate. It is guaranteed by cooperated use of multiple additives that a dense and stable SEI film is formed on the surface of the negative electrode, and high-temperature storage performance and high-temperature cycle performance of the battery are improved. Herein, the lithium tetrafluoroborate may react with the lithium bisoxalate borate in a certain degree, a formed intermediate product, lithium difluoroborate, may form a film on the surface of the positive electrode by oxidation on the one hand, the electrolyte is effectively prevented from directly contacting with the positive electrode material, and the electrolyte is avoided from being catalyzed and oxidized on the surface of the positive electrode; on the other hand, an O hole center on the M-O surface of the positive electrode material reacts with ODFB$^-$ to generate a Lewis acid $F_2BOC \cdot O$ free radical and then coordinate with O on the M-O surface, and at the same time, they are mutually combined to form a bond through two free electrons, and stably exist on the M-O surface, thereby the activity of the active site is inhibited, the oxidative decomposition of the electrolyte is reduced, and the cycle performance of the battery is improved; and the dissolution of metal ions may also be reduced, the negative electrode SEI film is avoided from being destroyed by the metal ions, and the cycle performance of the battery is improved. The lithium ion battery electrolyte having the functional additive of the present application contains the lithium tetrafluoroborate, the lithium bisoxalate borate and the lithium difluoroborate at the same time while used, and may still maintain a higher electrical property in a low-temperature or high-temperature environment by using respective advantages.

The above are only preferred embodiments of the disclosure, and are not used to limit the disclosure. Various modifications and changes may be made to the disclosure by those skilled in the art. Any modifications, equivalent replacements, improvements and the like made within spirit and principle of the disclosure should be included in a scope of protection of the disclosure.

What is claimed is:

1. An electrolyte functional additive for a lithium ion battery, wherein calculated in parts by weight, the functional additive comprises 0.1-0.5 parts of lithium tetrafluoroborate, 0.3-1.5 parts of lithium bisoxalate borate, 0.2-2 parts of vinylene carbonate, and 0.2-1 parts of pyridine trifluoroborate.

2. The functional additive according to claim 1, wherein a weight ratio of the lithium tetrafluoroborate and the lithium bisoxalate borate is 1:2-1:4.

3. A lithium ion battery electrolyte, comprising an organic solvent, an electrolyte lithium salt, and a functional additive, wherein the functional additive is the functional additive according to claim 1.

4. The lithium ion battery electrolyte according to claim 3, wherein the mass content of the functional additive in the lithium ion battery electrolyte is 2.5-5%.

5. The lithium ion battery electrolyte according to claim 3, wherein calculated by lithium ions, the concentration of the electrolyte lithium salt in the lithium ion battery electrolyte is 0.8-2.0 mol/L, preferably the electrolyte lithium salt comprises lithium hexafluorophosphate and lithium bisfluorosulfonimide, and further preferably a molar ratio of the lithium hexafluorophosphate and the lithium bisfluorosulfonimide is 6-10:1.

6. The lithium ion battery electrolyte according to claim 3, wherein the organic solvent comprises at least one of ethylene carbonate, propylene carbonate, diethyl carbonate, and ethyl methyl carbonate.

7. The lithium ion battery electrolyte according to claim 6, wherein the organic solvent is selected from a mixture formed by arbitrary three or more of the ethylene carbonate, the propylene carbonate, the diethyl carbonate, and the ethyl methyl carbonate.

8. The lithium ion battery electrolyte according to claim 6, wherein the organic solvent is a mixture formed by the ethylene carbonate, the propylene carbonate, the diethyl carbonate, and the ethyl methyl carbonate, and a mass ratio of the ethylene carbonate, the propylene carbonate, the diethyl carbonate and the ethyl methyl carbonate in the organic solvent is 2-3:0.3-0.8:1.5-3:4-7.

9. A lithium ion battery, wherein the lithium ion battery comprises a positive electrode plate, a diaphragm, a negative electrode plate and an electrolyte, wherein the electrolyte is the electrolyte according to claim 3.

10. The lithium ion battery according to claim 9, wherein the positive electrode plate comprises a positive electrode active substance, and the positive electrode active substance comprises a nickel-manganese binary layered material $LiNi_xMn_yO_2$, wherein $0.5<x\leq0.8$, $0.1<y\leq0.5$ and $x+y=1$.

11. The lithium ion battery according to claim 9, wherein the diaphragm is a ceramic diaphragm.

12. The lithium ion battery according to claim 9, wherein the mass content of the functional additive in the lithium ion battery electrolyte is 2.5-5%.

13. The lithium ion battery according to claim 9, wherein calculated by lithium ions, the concentration of the electrolyte lithium salt in the lithium ion battery electrolyte is 0.8-2.0 mol/L.

14. The lithium ion battery according to claim 13, wherein the electrolyte lithium salt comprises lithium hexafluorophosphate and lithium bisfluorosulfonimide, and a molar ratio of the lithium hexafluorophosphate and the lithium bisfluorosulfonimide is 6-10:1.

15. The lithium ion battery according to claim 9, wherein the organic solvent comprises at least one of ethylene carbonate, propylene carbonate, diethyl carbonate, and ethyl methyl carbonate.

16. The lithium ion battery according to claim 15, wherein the organic solvent is selected from a mixture formed by arbitrary three or more of the ethylene carbonate, the propylene carbonate, the diethyl carbonate, and the ethyl methyl carbonate.

17. The lithium ion battery according to claim 15, wherein the organic solvent is a mixture formed by the ethylene carbonate, the propylene carbonate, the diethyl carbonate, and the ethyl methyl carbonate, and a mass ratio of the ethylene carbonate, the propylene carbonate, the diethyl carbonate and the ethyl methyl carbonate in the organic solvent is 2-3:0.3-0.8:1.5-3:4-7.

* * * * *